US012601752B2

(12) United States Patent
Schoenmakers et al.

(10) Patent No.: US 12,601,752 B2
(45) Date of Patent: Apr. 14, 2026

(54) SMART SAMPLE CONTAINER FOR COMPLEX SAMPLE EVALUATION WORKFLOWS

(71) Applicant: FEI Company, Hillsboro, OR (US)

(72) Inventors: Remco Schoenmakers, Eindhoven (NL); Engelbertus van Willigen, Eindhoven (NL); Reinier Perquin, Eindhoven (NL); Pepijn Kramer, Eindhoven (NL); Egbert Algra, Eindhoven (NL); James Mccormack, Eindhoven (NL); Trond K Varslot, Vuku (NO); Faruk Caglar, Eindhoven (NL)

(73) Assignee: FEI Company, Hillsboro, OR (US)

( * ) Notice: Subject to any disclaimer, the term of this patent is extended or adjusted under 35 U.S.C. 154(b) by 1189 days.

(21) Appl. No.: 17/193,593

(22) Filed: Mar. 5, 2021

(65) Prior Publication Data

US 2022/0283197 A1     Sep. 8, 2022

(51) Int. Cl.
*G01N 35/00* (2006.01)
*B01L 3/00* (2006.01)

(52) U.S. Cl.
CPC ........ *G01N 35/00732* (2013.01); *B01L 3/545* (2013.01); *G01N 35/00871* (2013.01); *G01N 2035/00821* (2013.01)

(58) Field of Classification Search
CPC ....... G01N 35/00732; G01N 35/00871; G01N 2035/00821; G01N 2035/00851; G01N 35/00; G01N 23/2204; G01N 23/225; G01N 35/0092; G01N 2035/00742; G01N 2035/00831; G01N 2035/00881; B01L 3/545; B01L 2200/147; B01L 2200/18; B01L 2300/02; B01L 2300/021; B01L 2300/022; B01L 2300/024; B01L 2300/0663; B01L 3/5025; G06Q 10/103
See application file for complete search history.

(56) References Cited

U.S. PATENT DOCUMENTS

2012/0330564 A1*  12/2012  Bland ...................... G01N 1/30
                                                                     702/19
2019/0234975 A1    8/2019  Pothini et al.

OTHER PUBLICATIONS

EP22159134.0, Extended European Search Report, Aug. 8, 2022, 7 pages.

* cited by examiner

*Primary Examiner* — Xin Y Zhong

(57) ABSTRACT

Systems and methods for using smart sample containers to manage complex sample evaluation workflows, are disclosed. An example method for using a smart sample container configured to manage a sample evaluation workflow according to the present invention comprises, obtaining a sample evaluation workflow for the one or more samples, receiving interactions with external devices, and based on the sample evaluation workflow, and causing the external devices to perform actions to advance the sample evaluation workflow. The smart sample container may further modify the sample evaluation workflow based on results of actions performed by the sample evaluation workflow and/or store information relating to the results of such actions. In this way, the smart sample containers are able to dynamically drive the evaluation of a sample through its sample evaluation workflow.

19 Claims, 3 Drawing Sheets

300

302

TRANSMIT AN INTERACTION TO A SMART
SAMPLE CONTAINER

304

RECEIVE AN INTERACTION WITH A SMART
SAMPLE CONTAINER

306

PERFORM AN ACTION TO ADVANCE THE
SAMPLE EVALUATION WORKFLOW

308

TRANSMIT AN INTERACTION INDICATING THE
ACTION IS COMPLETE

SMART SAMPLE CONTAINER FOR COMPLEX SAMPLE EVALUATION WORKFLOWS

BACKGROUND OF THE INVENTION

As microscopy systems have become more powerful and specialized, the systems and process for evaluating specimens with such microscopy systems have grown increasingly complex (i.e., comprising many steps for sample preparation/evaluation across many separate devices). For example, a cryogenic electron microscopy evaluation workflow may involve the steps of affixing a specimen to a sample container with a first device, vitrification of the specimen with a second device, examining the vitrification results with a third device, and then evaluating the specimen with a fourth device. In addition, the desired results for the evaluation of modern samples have grown increasingly specimen dependent. Specifically, to achieve desired results for current specimens with different sample types/features/specifications, the microscopy processes and device parameters must be particularly tailored for each individual specimen. Thus, because of this increased complexity in the systems/process for evaluating specimens and the need to individually tailor the systems/processes on a case by case basis, it has become increasingly more difficult to track and manage sample evaluation workflows across many specimens in a laboratory setting.

These difficulties are presently addressed with the use of complex centralized management systems, such as master record books or database management systems. In these centralized management systems, all samples are tracked, the evaluation workflows for individual sample are generated, stored, optimized, and/or otherwise managed, the types/features/specifications of the samples are tracked, the parameters/requirements for individual samples are stored, etc. However, creating and maintaining such centralized systems is expensive and difficult. Moreover, because centralized management systems rely on performance and communication with a single source the entire management system fails if the centralized management system breaks, if communication between a sample evaluation device and the centralized management system breaks, or if a specimen is transferred such that the centralized management system cannot monitor it. Therefore, it is desired to have more reliable methods and systems for monitoring the progression of specimens through complex sample evaluation workflows.

SUMMARY OF THE INVENTION

Systems and methods for using smart sample containers to manage complex sample evaluation workflows, are disclosed. An example method for using a smart sample container configured to manage a sample evaluation workflow according to the present invention comprises obtaining a sample evaluation workflow for the one or more samples. Obtaining the sample evaluation workflow comprises receiving an uploaded workflow from an external device. In various embodiments of the present disclosure, obtaining the sample evaluation workflow may comprise receiving instances of sample information, and determining the sample evaluation workflow based on the sample information (i.e., obtaining the sample evaluation workflow from a set of preset sample evaluation workflows, updating one or more steps of a preset workflow to obtain the sample evaluation workflow, determining, based on the instances of sample information, one or more of evaluation step(s) that are to be performed, external device(s) that are to perform the evaluation step(s), and external device settings for performing the evaluation step(s), etc.). The example method further includes receiving an interaction with an external device, and then based on the sample evaluation workflow, causing the external device to perform an action to advance the sample evaluation workflow.

An example smart sample container configured to manage a sample evaluation workflow according to the present invention comprise a region of the sample container for holding a sample carrier holding one or more samples, and an outer support structure that defines the region of the sample container for holding the sample carrier holding. The example smart sample container further includes a communication interface, one or more processors, and a memory storing computer readable instructions that, when executed on the one or more processors, cause the one or more processors to perform the steps of obtaining a sample evaluation workflow for the one or more samples, receiving an interaction with an external device, and then based on the sample evaluation workflow, causing the external device to perform an action to advance the sample evaluation workflow.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicates similar or identical items.

Figure 1:
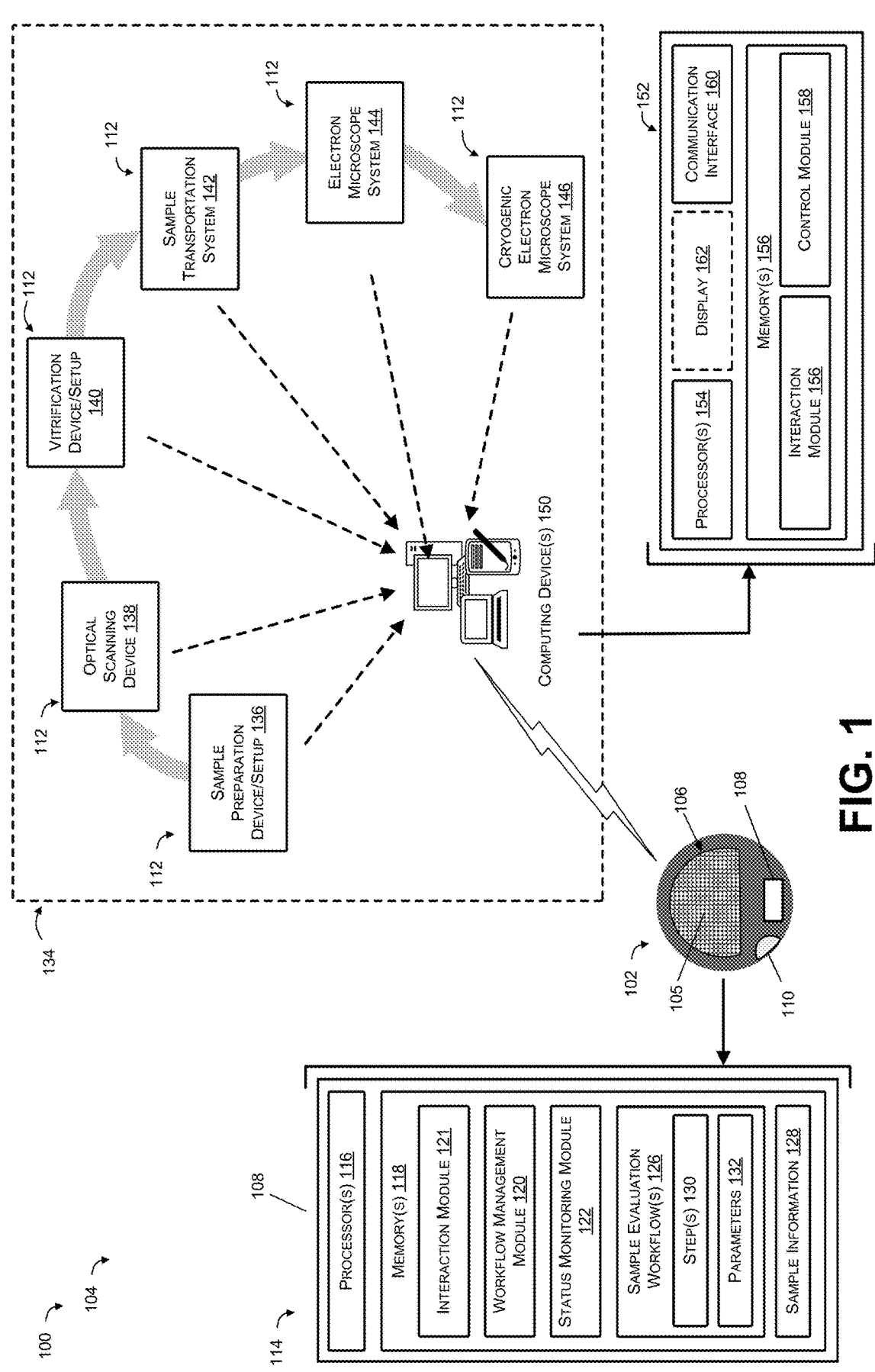
FIG. 1 illustrates of an example environment where a smart sample container according to the present invention may manage and/or drive the progression of a sample evaluation workflow.

Like reference numerals refer to corresponding parts throughout the several views of the drawings. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

DETAILED DESCRIPTION OF EMBODIMENTS

Systems and methods for using smart sample containers to manage complex sample evaluation workflows are disclosed herein. More specifically, the disclosure includes smart sample containers that are configured to receive, determine, optimize, adjust, drive, and/or otherwise manage the sample evaluation workflow for one or more samples that the smart sample container contains.

Smart sample containers according to the present disclosure are able to determine relevant sample evaluation workflow(s), store such workflows, store the desired parameters and/or settings for steps in such workflows, track the condition/status of the samples they contain, and because the smart sample containers are able to communicate directly with external devices, smart sample containers according to the present disclosure are able to drive the progression of the samples they contain through their respective sample evaluation workflows without involving a centralized tracking and decision making system. Thus, users are no longer required to use such centralized tracking systems to manage the progress of different samples, as a plurality of smart sample containers according to the present disclosure can be used to independently drive the samples they respectively contain through independent sample evaluation workflows. Moreover, as the smart sample containers can be configured in some embodiments to deliver executable scripts to sample transportation devices and other external devices that cause those devices to transport and/or execute steps of the sample evaluation workflow, the smart sample containers allow at least portions of the progression of samples through their sample evaluation workflow to be completely automated.

FIG. 1 is an illustration of an example environment 100 where a smart sample container 102 may manage and/or drive the progression of a sample evaluation workflow. Specifically, FIG. 1 illustrates the environment 100 as being a cryo-laboratory environment 104 where the smart sample container 102 is able to manage and/or drive the progression of sample(s) it contains through a cryogenic electron microscopy evaluation workflow. However, persons having skill in the art will understand that smart sample containers 102 according to the present disclosure would be capable of driving other sample evaluation workflows in other example environments.

According to the present disclosure, the smart sample container 102 is a transportation medium of a sample while the sample is outside of an external device 112. In some embodiments the smart sample container 102 is a protective case/vessel configured to transport one or more sample carriers 105 (e.g., a copper grid(s)) when the sample carrier is outside of an external device 112. Sample carriers correspond to the medium which the sample is affixed for examination within various external devices 112. In other embodiments, sample carriers 105 may be component elements of the smart sample container 102.

FIG. 1 illustrates smart sample container 102 as comprising an outer support structure that defines a region 106 for holding a single sample carrier 105 for holding one or more samples. In other examples, the smart sample container 102 may define a plurality of regions 106 for holding sample carriers 105, or may define a single region for holding a plurality of sample carriers 105. The smart sample container 102 is shown as having a circular shape, however it may have other shapes according to the present invention. Specifically, the smart sample container 102 may have any shape that allows it to be loaded into and/or operate within an external device during a corresponding sample evaluation workflow (e.g., sample preparation device, an optical microscope, a storage device, a transportation device, an electron microscope, etc.). The sample carrier 105 in the example smart sample container 102 shown in FIG. 1 comprises a plurality of inner support structures that define a plurality of apertures, where a thin film is positioned over the apertures and supported by the inner support structures. In this way, such a thin film may support a sample while allowing an electron beam (or other emitted particles) to pass through the thin film.

FIG. 1 also shows the smart sample container 102 as including computing hardware 108 that allows the smart sample container 102 to manage and/or drive the progression of a sample evaluation workflow, and a communication interface 110 that allows for electronic communication between the computing hardware 108 and individual external devices 112 during progression through a sample evaluation workflow. In various embodiments the communication interface 110 may correspond to one or more of near field network interface (e.g., Bluetooth, wireless, RFID, short wave, etc.) and/or a wired network interface.

FIG. 1 further illustrates computing device(s) 150 associated with the external devices 112 that are capable of communicating with the smart sample container 102 via the communication interfaces 110. While FIG. 1 illustrates computing device(s) 150 as a single element, a person having skill in the art would understand that in embodiments individual computing device(s) can be separately incorporated into and/or otherwise connected to a respective external device 112. In this way, the communication interface 110 may allow for near field communication between the computing hardware 108 of the smart sample container 102 and individual computing device 150 associated with a specific external device 112.

Additionally, FIG. 1 illustrates the computing device(s) 150 as being separate from the external devices 112, however in various embodiments one or more of these elements may be combined. That is, applicant notes that the computing device(s) 150 may be a component of an individual external device 112, may be a separate device from the associated external device 112 in communication via a network communication interface, or a combination thereof. For example, an example electron microscope system 144 may include a first computing device 150 that is a component portion of the electron microscope system 144, and which acts as a controller that drives the operation of the electron microscope system 144 (e.g., adjust the scanning location on the sample carrier by operating the scan coils, etc.). In such an embodiment the electron microscope system 144 may also include a second computing device 150 that is desktop computer separate from the electron microscope system 144, and which is executable to process data received from electron microscope system 144 to generate images of the sample(s) on the smart sample container 102 and/or perform other types of analysis. In such embodiments, the communication interface 110 may allow for communication with the first computing device, the second computing device, or both.

Those skilled in the art will appreciate that the computing devices 150 depicted in FIG. 1 are merely illustrative and are not intended to limit the scope of the present disclosure. The computing system and devices may include any combination of hardware or software that can perform the indicated functions, including computers, network devices, internet appliances, PDAs, wireless phones, controllers, etc. The computing devices 150 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

FIG. 1 further includes a schematic diagram illustrating an example computing architecture 114 for the computing hardware 108 of the smart sample container 102. Example computing architecture 114 illustrates additional details of hardware and software components that can be used to implement the techniques described in the present disclosure. In the example computing architecture 114, the computing hardware 108 of the smart sample container 102 includes one or more processors 116 and memory 118 communicatively coupled to the one or more processors 116.

The example computing architecture 114 can include an interaction module 119, a workflow management module 120, and a status monitoring module 122 stored in the memory 118. The example computing architecture 114 is further illustrated as including sample evaluation workflow(s) 126 and sample information 128 stored on memory 118. The sample information 128 may correspond to data that describes characteristics of a sample, identification information for the sample, a history of the sample, a status of the sample, a location of the sample on the smart sample container 102, etc. The sample evaluation workflow(s) 126 is collection of workflow steps 130 (e.g., sample creation, optical analysis, vitrification, post-vitrification electron analysis, cryogenic electron analysis, etc.). Individual steps 130 correspond to actions (e.g., sample creation, transportation between devices, vitrification, storage, etc.) and/or evaluation processes (e.g., imaging of the sample, structure analysis, spectroscopy, etc.) The sample evaluation workflow(s) 126 may further identify parameters 132 associated with the sample evaluation workflow(s) 126 and/or the steps 130 thereof (e.g., timing limitations, device settings, step 130 modifications, user selections, etc.).

For example, a sample evaluation workflow 126 may be a data structure that identifies a plurality of steps 130 that are to be carried out in a particular order, where the data structure may also identify various parameters 130 for the workflow and/or individual steps 130. For example, a sample evaluation workflow 126 on a smart sample container 102 configured to manage/drive the evaluation of the samples it contains in the cryo-laboratory environment 104 may correspond to a cryogenic electron microscopy evaluation workflow.

An example cryogenic electron microscopy evaluation workflow 134 is depicted in FIG. 1. The example cryogenic electron microscopy evaluation workflow 134 is shown as including a first step where a sample preparation device 136 is used to prepare the sample on the smart sample container 102, an optical scanning device 138 is used to asses—the characteristics of the sample on the smart sample container 102, a vitrification device 140 is used to vitrify the sample to create a cryogenic sample, a sample transportation system 142 is used to move the smart sample container 120 between devices, an electron microscope system 144 is used to assess the characteristics of the cryogenic sample, and a cryogenic electron microscope system 146 is used to evaluate/image the cryogenic sample. Applicant notes that the cryogenic electron microscopy evaluation workflow 134 is merely an example of one type of sample workflow that the smart sample container 102 may be used to drive and/or manage, and that a person having skill in the art would understand that the sample evaluation workflow 126 may correspond to steps and parameters for many combinations for evaluations of different types and/or of different types of samples.

Moreover, parameters 132 may identify one or more specifications and or characteristics associated with the steps 130. For example, the parameters may include but are not limited to device settings, types of actions/evaluations to be performed, desired results (types, characteristics, etc.), time frames for individual steps, and/or time frames for the workflows completion.

As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other instances, any or all of modules can be implemented in whole or in part by hardware (e.g., a specialized processing unit, etc.) to execute the described functions.

The interaction module 119 can be executable by the processors 116 to cause the smart sample container 102 to communicate with the computing devices 150 associated with the external devices 112. The interaction module 119 may be configured to communicate using multiple protocols for different external devices 112, using a uniform protocol that is applicable for multiple devices of different types/manufactures, or a combination thereof. The interaction module 119 may use such protocols to exchange information between the smart sample container 102 and individual external devices 112. For example, the interaction module 119 may facilitate the exchange of sample information, a sample evaluation workflow 126, results of the performance of individual steps 130, evaluation results, etc. from an external device 112 to the smart sample container 102. Additionally, the interaction module 119 may also facilitate the exchange of sample information, a sample history, a sample evaluation workflow 126, a step to be performed, parameters, etc. from the smart sample container 102 to an external device 112. For example, the interaction module 119 may cause a transmission to be sent via the communication interface 110 that causes an associated external device 112 to perform an action (e.g., a step, a portion of a step, etc.) that progresses a sample evaluation workflow 126. In some embodiments, this may correspond to transmitting an executable script that, when executed by the associated computing device 150, causes the external device 112 to automatically perform the action.

Moreover, in some embodiments, the interaction module 119 is executable to receive a request for information from a computing device 150 via the communication interface 110, access the sample examination workflow 126 and/or sample information 128, and then cause the requested information to be transmitted to the requesting device. In this way, the interaction module 119 enables the smart sample container 102 to provide information about samples it contains and/or the associated sample evaluation workflows without having to access a centralized tracking system, such as a network database. For example, a computing device 150 associated with a user interface (e.g., a screen, VR goggles, an augmented reality interface, etc.) may request information about a sample on the smart sample container 102, and the interaction module 119 may cause data to be transmitted to the computing device 150 that allows information such as sample information, a history of the sample, acquired evaluation results, results of performed steps 130, the sample evaluation workflow 126, etc., to be displayed to the user via the user interface.

The workflow management module 120 can be executable by the processors 116 to obtain, determine, drive, and/or otherwise manage the progression of samples on the smart sample container 102 through their respective sample evaluation workflow(s) 126. In some embodiments, obtaining the sample evaluation workflow(s) 126 may correspond to receiving the sample evaluation workflow(s) 126 from an external device via communication interface 110. For example, a user may input one or more selections into an external device or associated computing device 150 (i.e., selections including but not limited to a sample evaluation workflow type, a sample evaluation workflow template, one or more steps, an order of steps, a desired output, a desired type of evaluation, a type of sample, parameters, a combination thereof, etc.), and one or more modules of the external device or associated computing device 150 may determine the sample evaluation workflow(s) 126 and the transmit the sample evaluation workflow(s) 126 to the smart sample container 102 via the communication interface 110.

Alternatively, the workflow management module 120 may be executable to determine the sample evaluation workflow(s) 126 based on an interaction with a computing device 150. For example, based on receiving sample information, a desired evaluation type, and an indication of available external devices, the workflow management module 120 may select a sample evaluation workflow(s) 126 from a plurality of preset sample evaluation workflow(s) 126. In some embodiments, the present sample evaluation workflow(s) are stored on the memory 118. Moreover, in some embodiments the workflow management module 120 may further be executable to modify one or more steps 130 and/or parameters 132 to optimize the sample evaluation workflow(s) 126 for the specific case. Alternatively, or in addition, obtaining the sample evaluation workflow(s) 126 may correspond to selecting one or more steps 130 and/or parameters 132 based on an interaction with an external device to generate the sample evaluation workflow(s) 126. For example, based on an interaction that indicates that a desired outcome of the evaluation the sample on the smart sample container 102, the workflow management module 120 may determine a sample evaluation workflow 126 having one or more steps and/or parameters that will result in the desired outcome. In this way, the workflow management module 120 is able to obtain sample evaluation workflow(s) 126 that allow the smart sample container 102 to drive and/or otherwise manage the progression of one or many sample(s) it holds through their respective sample evaluation workflow(s) 126.

The workflow management module 120 may further be executable to update and/or otherwise modify the sample evaluation workflow(s) 126 and/or sample information 128 based on interactions received from external devices 150. For example, based on an interaction indicating that a step and/or action has been performed by an external device 112, the workflow management module 120 may update the sample evaluation workflow(s) 126 to reflect what has been performed and/or include results or updated information from the executed step and/or action. In this way, the workflow management module 120 is able to ensure that the smart sample container 120 stores the history, sample status, and results from one or more steps 130 of the sample evaluation workflow(s) 126. In another example, the workflow management module 120 can update a sample evaluation workflow 126 based on information/results received from an external device 112. For example, based on an interaction with a computing device 150 associated with an electron microscope system 114 that indicates the status of the sample after vitrification, the workflow management module 126 may alter the parameters 132 associated with evaluation of the sample with the cryogenic electron microscope system 146 so that more optimal results are obtained.

The workflow management module 120 may further be executable to drive the progression of the sample evaluation workflow(s) 126. For example, the workflow management module 120 may determine a current step 130 of the sample evaluation workflow 126 or associated action that is to be performed, and cause the interaction module 121 to transmit data that cause a notification of the next step/action to be presented on a user interface, cause a sample transportation system 142 to move the smart sample container 102 to an external device 112 associated with the next step/action, cause an external device 112 to perform the next step/action. In some embodiments, the workflow management module 120 may drive the progression of a sample evaluation workflow 126 by determining a next step that is to be performed by an external device 112, identifying sample information and/or parameters associated with the step (i.e., sample information or parameters that the external device 112 may use to perform the next step), and then cause the interaction module 119 to transmit the a notification of the next step, sample information, parameters, and/or an executable script that causes the external device 112 to automatically execute the next step. For example, based on receiving an interaction from an electron microscope system 114, the workflow management module 120 may cause an interaction to be provided that indicates that the electron microscope system 144 is to evaluate the condition vitrified sample, provide a location of the sample on the smart sample container 102, provide parameters that the electron microscope system 144 should use to evaluate the sample, and/or provide an executable script that causes the electron microscope system 144 to perform the evaluation of the vitrified sample without additional user input. In some embodiments, based up on receiving an indication via the communication interface 108 that the external device 112 is not able to perform the next step (e.g., is busy, is not currently functioning, and/or otherwise does not have the ability to perform the requested action), the workflow management module 120 may identify or otherwise cause the smart sample container 102 to be transported to a new external device 112 capable of performing the next step. For example, if an external device 112 provides a time of when it can perform the requested next step, and the workflow management module 120 determines that the time is not within a threshold time period in which the step is to be performed (e.g., outside of the time period that the sample will stay viable), the workflow management module 120 may identify a new external device that is able to perform the next step within the desired time frame.

Then, upon receiving an indication from the electron microscope system 144 via the communication interface 108 that the evaluation of the vitrified sample is complete and/or a result of such an evaluation, the workflow management module 120 is further executable to update the associated sample evaluation workflow 126 to reflect that the step is finished and/or store the result on the memory 118. The workflow management module 120 may then determine a new next step 130 of the sample evaluation workflow 126 or associated action that is to be performed, and cause the interaction module 121 to transmit data that causes a notification of the new next step/action to be presented on a user interface, cause a sample transportation system 142 to move the smart sample container 102 to a new external device 112 associated with the new next step/action, cause the new external device 112 to perform the new next step/action.

The status monitoring module 122 may be executable to monitor the status of the smart sample container 102, and cause an adjustment of the sample evaluation workflows based on detected status events. For example, the smart sample container 102 may optionally include one or more sensors (e.g., temperature sensors, motion detector, GPS, gyroscope, etc.) that monitor the status of the smart sample container 102. In such embodiments, the status monitoring module 122 may be configured to determine when the sensors have detected an event (e.g., the smart sample container being dropped or jostled, the temperature of the sample container being outside of a desired range, the smart sample container leaving a certain area, etc.), and then cause the workflow management module 120 to adjust the sample evaluation workflow 126 accordingly. For example, based on the status monitoring module 122 determining that the smart sample container 102 has been dropped, the status monitoring module 122 may cause the workflow management module 120 to add a new step to the sample evaluation workflow 126 for the sample to be evaluated by a light or electron microscope. In this way, the smart sample container 102 is able to automatically initiate an investigation of damage to the sample when the smart sample container is dropped.

FIG. 1 further shows an additional schematic diagram illustrating an example computing architecture 152 for individual computing device(s) 150. Example computing architecture 152 illustrates additional details of hardware and software components that can be used to implement the techniques described in the present disclosure. In the example computing architecture 152 of the individual computing device(s) 150 includes one or more processors 154 and memory 156 communicatively coupled to the one or more processors 154.

The example computing architecture 152 can include an interaction module 156 and a control module 158 stored in the memory 156. The interaction module 156 can be executable by the processors 154 to cause the associated computing device 150 to communicate with the smart sample container 102 via a communication interface 160. For example, the interaction module 156 may enable the computing device 150 to receive an interaction from the smart sample container 102 that indicates instructions for a step in the evaluation workflow 126, sample parameters, recommended external device settings, a sample type, a location of the sample on the smart sample container, a history of the sample, an identification code for the sample, etc. The interaction module 156 may further enable the computing device 150 to send an interaction to the smart sample container 102 that indicates a status of the associated external device 112, a result of the step, new sample information determined by the external device 112, etc.

The control module 158 can be executable by the processors 154 to cause a computing device 150 and/or an external device 112 to take one or more actions and/or perform a step of the sample evaluation workflow. In some embodiments, the control module 158 may be executable to adjust the settings of the associated external device 112, cause the associated external device 112 to perform particular operations, or a combination thereof. Alternatively, or in addition, the control module 158 may cause a display 162 to present a protocol to a user, present information about the smart sample container 102, etc. In some embodiments, the control module 158 may cause the display 162 to present a graphical user interface that includes selectable interfaces that allow a user to input and/or alter data associated with the sample container 102 and/or select protocol steps used to be performed or parameters to be by associated external device 112. The control module 158 may be further executable to cause information from the external device 122 to be transmitted to the smart sample container 102.

The computing hardware 108 and the computing devices 150 include one or more processors configured to execute instructions, applications, or programs stored in a memory(s) accessible to the one or more processors. In some examples, the one or more processors may include hardware processors that include, without limitation, a hardware central processing unit (CPU), a graphics processing unit (GPU), and so on. While in many instances the techniques are described herein as being performed by the one or more processors, in some instances the techniques may be implemented by one or more hardware logic components, such as a field programmable gate array (FPGA), a complex programmable logic device (CPLD), an application specific integrated circuit (ASIC), a system-on-chip (SoC), or a combination thereof.

The memories accessible to the one or more processors are examples of computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device. In general, computer storage media may include computer executable instructions that, when executed by one or more processing units, cause various functions and/or operations described herein to be performed. In contrast, communication media embodies computer-readable instructions, data structures, program modules, or other data in a modulated data signal, such as a carrier wave, or other transmission mechanism. As defined herein, computer storage media does not include communication media.

Those skilled in the art will also appreciate that items or portions thereof may be transferred between memory and other storage devices for purposes of memory management and data integrity. Alternatively, in other implementations, some or all of the software components may execute in memory on another device and communicate with the computing hardware 108 and the computing devices 150. Some or all of the system components or data structures may also be stored (e.g., as instructions or structured data) on a non-transitory, computer accessible medium or a portable article to be read by an appropriate drive, various examples of which are described above. In some implementations, instructions stored on a computer-accessible medium separate from the computing hardware 108 and the computing devices 150 may be transmitted to the computing hardware 108 and the computing devices 150 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium.

Figure 2:
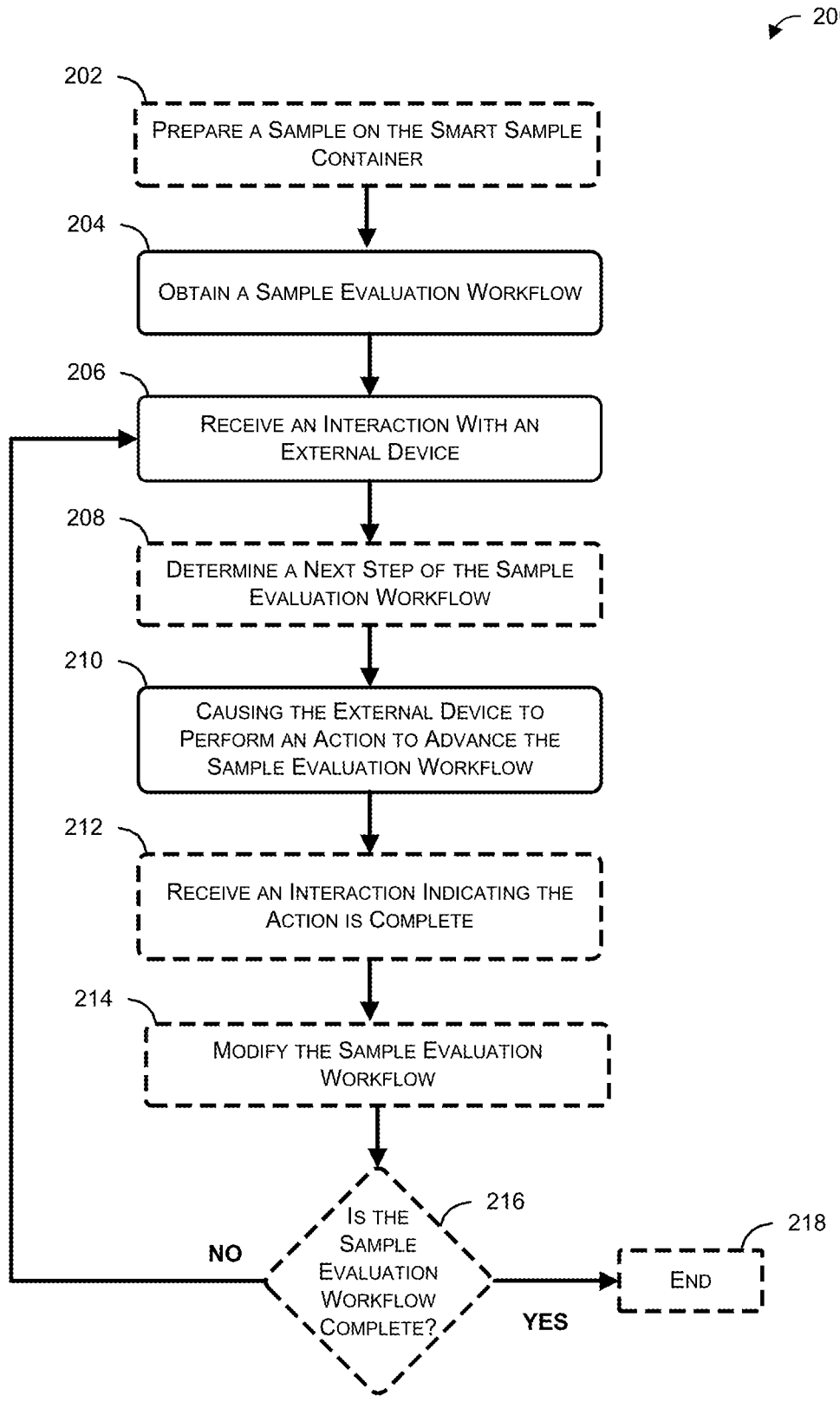
FIG. 2 depicts an example process for managing and/or driving the progression of a sample evaluation workflow using a smart sample container according to the present invention.

FIG. 2 is a depicts a sample process 200 managing and/or driving the progression of a sample evaluation workflow using a smart sample container according to the present invention. The process 200 may be implemented with the smart sample containers 102, in any environments, including any of the example cryo-EM environment(s) 100.

At 202, a sample is prepared and placed on a smart sample container having a communication interface, a processor, and a memory storing instructions that cause the smart sample container to manage/drive the progression of the sample through a sample evaluation workflow. In some embodiments, preparing the sample may correspond to removing a small portion (e.g., a lamella, slice, crystal fragment, etc.) of a main sample body, and then attaching the small portion to a sample carrier (e.g., a sample grid) that is to be transported by the smart sample container. Alternatively, or in addition, preparing the sample comprises mixing a sample that is to be evaluated on a cryo-EM in a solution such that the sample is suspended in the solution, and/or adding the solution/samples suspended therein to sample carrier. In some embodiments, preparing the sample may further include the smart sample container receiving sample information (e.g., a sample type; a location of the sample on the smart sample container; a history of the sample; an identification code for the sample, etc.) about the sample via the communication interface, and the smart sample container storing the sample information locally in its memory.

At step 204, a sample evaluation workflow is obtained by the smart sample container. In some embodiments, obtaining the sample evaluation workflow may correspond to the smart sample container receiving the sample evaluation workflow from an external device via the communication interface. For example, a user may input one or more selections into an external device or associated computing device (i.e., selections including but not limited to a sample evaluation workflow type, a sample evaluation workflow template, one or more steps, an order of steps, a desired output, a desired type of evaluation, a type of sample, parameters, a combination thereof, etc.), the external device or associated computing device may generate the sample evaluation workflow at least partially based on such user input, and then the external device or associated computing device may transmit the generated sample evaluation workflow to the smart sample container via the communication interface.

Alternatively, or in addition, obtaining the sample evaluation workflow may include the smart sample container configured to at least partially determine the sample evaluation workflow. For example, based on receiving sample information, a desired evaluation type, and an indication of available external devices, the smart sample container may select a preset sample evaluation workflow, select one or more steps and/or parameters based on preset rules, or a combination thereof. For example, based on the smart sample container receiving an interaction that indicates a desired outcome of the evaluation of the sample, the smart sample container may select a sample evaluation protocol associated with the desired outcome. Moreover, in some embodiments, instead of generating the sample evaluation workflow in its entirety, the smart sample container may modify one or more steps and/or parameters of a preset sample evaluation workflow or a sample evaluation workflow received via the communication interface. In this way, the smart sample container may be configured to itself optimize the sample evaluation workflow for the specific sample and/or environment. For example, based on the ambient temperature of the smart sample container or its environment, the smart sample container may adjust timing thresholds to avoid harmful melting of a cryogenic sample. In another example, the smart sample container may use the sample information stored on its memory to select parameters associated with individual steps in the sample evaluation workflow so that each step is optimized for the characteristics of the sample.

At step 206, the smart sample container receives an interaction with an external device via the communications interface. In various embodiments the communication interface may correspond to one or more of near field network interface (e.g., Bluetooth, wireless, RFID, short wave, etc.) and/or a wired network interface. The smart sample container may be programmed to communicate using a plurality of protocols for different external devices, a common protocol for multiple devices, or a combination thereof.

At step 208, the smart sample container may determine the next step of the sample evaluation workflow. This corresponds to the smart sample container accessing the sample evaluation workflow as stored in its local memory, determining a progression point of the smart sample container in the sample evaluation workflow, and then determining the next step and/or action that is to be performed to advance the smart sample container within the sample evaluation workflow. For example, where the sample is a lamella that was produced from a semiconductor sample on a dual beam microscope system, the smart sample container may determine that the next step is for a specific imaging system (e.g., a transmission electron microscope (TEM), a light microscope, a scanning electron microscope (SEM), an atomic force microscope, an electrical failure analysis system (EFA), etc.) to evaluate the lamella. In such an example, the smart sample container may access parameters/sample information received from and/or determined based upon data received by the smart sample container from the dual beam microscope system (e.g., a location of the lamella on the sample container, the source of the lamella, the geometry of the lamella, the geometry of the lamella, the state of the lamella, the features in the lamella to be investigated, beam characteristics that are optimal for evaluation of the feature/ lamella, the type of evaluation to be conducted, etc.). Because the sample evaluation workflow and associated parameters/sample information are stored locally on the memory of the smart sample container, the smart sample container is able to determine its progression point and/or next action/step of the sample evaluation workflow without accessing a centralized storage system.

At step 210, the smart sample container causes the external device to perform an action to advance the sample evaluation workflow. In some embodiments, causing the external device to perform the action includes causing the transmission of data to the external device that either automatically causes the external device to perform the action, provides information for performing the action (e.g., description of the requested action, parameters for the action, sample information, etc.), or both. In some embodiments, the action to advance the sample evaluation workflow may correspond to the external device causing a display and/or notification to be presented on a user interface so that a user is aware of the status of the sample, results of the sample evaluation workflow, the next step in the sample evaluation workflow, or a combination thereof.

In another example, causing the external device to perform the action includes causing the transmission of an executable script that, when received by the external device, causes the external device to perform the next step and/or action in the sample evaluation workflow. In a similar example, causing the external device to perform the action includes causing the transmission of data that the external device may use to optimally perform the requested step/ action. For example, the smart sample container may provide an indication to an electron microscope that includes a request to image the sample, a region of the sample to be imaged, parameters for the imaging, information about the sample, a type of imaging, etc. In this way, without accessing a centralized storage system the electron microscope can use the data from the smart sample container to perform specialized actions/steps that advance the sample through its associated sample evaluation workflow.

In another example, causing the external device to perform the action includes indicating a different external device that is to perform the next action/step in the sample evaluation workflow. For example, based on the smart sample container receiving an indication that a step/action is complete, the smart sample container may determine the next step/action to be completed, and identify a different external device that is to perform this next step/action. The smart sample container may then transmit data that causes the external device to display a notification and/or interface that informs the user of the identity of the different external device that is to perform the next step/action. Alternatively, where the external device is a sample transportation device, the smart sample container my transmit an indication of the different external device, a location of the different external device, transportation requirements of the sample (e.g., temperature, time periods, etc.).

At step 212, the smart sample container may receive an interaction indicating that the action is complete via the communication interface. This may correspond to an indication of a type of action completed, a result of the action being completed, information about the performance of the action, information about the result, updated information about the sample, or a combination thereof.

At step 214, the smart sample container may modify the sample evaluation workflow. In various embodiments, the smart sample container may update the sample evaluation workflow as stored on its local memory to reflect that the action/step is finished, a result of the action/step being completed, information about the performance of the action/step, information about the result, updated information about the sample, or a combination thereof. For example, based on an interaction indicating a result of the evaluation of a recently vitrified sample with an electron microscope, the smart sample container may store one or more images of the vitrified sample obtained by the electron microscope, update sample information based on the result (e.g., clarity of the ice in different regions, new location information, new regions of the sample for further evaluation with a different external device, etc.), or both. In some embodiments, the smart sample container may be further programmed to adjust the steps or parameters of the sample evaluation protocol based on the interaction indicating that the action is complete. For example, based on the interaction the smart sample container may determine that a new action and/or step is to be added to the sample evaluation workflow. Alternatively or in addition, the smart sample container may determine based on the interaction that a step or parameter is not longer optimal for the sample, and adjust the sample evaluation workflow so that it is optimized based on the most recent sample information.

At 216, the smart sample container may determine if the sample evaluation workflow is complete. If the protocol is not complete, then process 200 may continue at step 206 when the smart sample container receives a new interaction with the same external device or a new external device. In this way, the smart sample container is able to drive the sample it holds through its associated sample evaluation workflow without accessing a centralized management system, and in some embodiments also able to continuously modify the sample evaluation workflow during the process to ensure optimal results.

Figure 3:
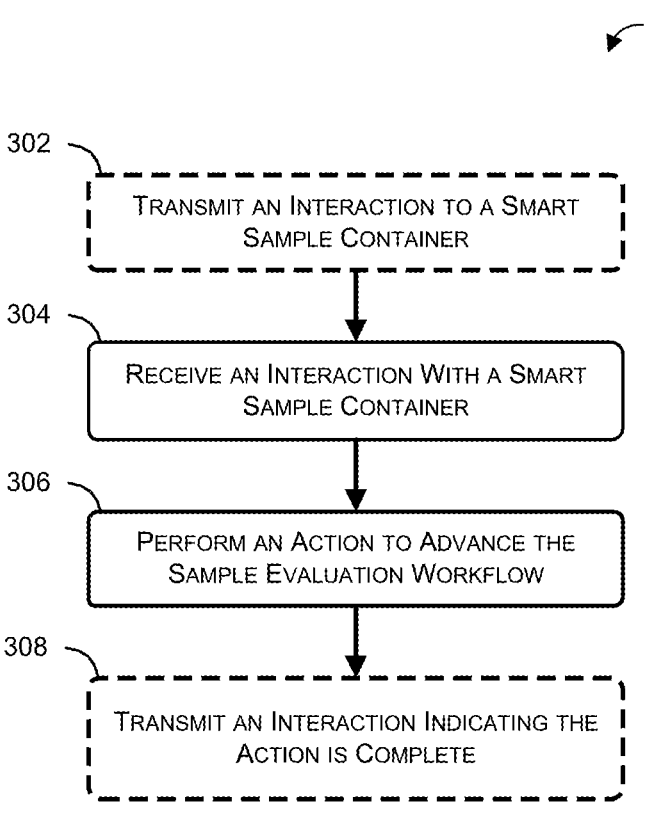
FIG. 3 depicts an example process for an external device performing actions within the progression of a sample evaluation workflow being driven/managed by a smart sample container according to the present invention.

FIG. 3 is a depicts a sample process 300 for an external device performing actions within the progression of a sample evaluation workflow being driven/managed by a smart sample container according to the present invention. The process 300 may be implemented with any of the external devices 112, in any environment, including any of the example cryo-EM environment(s) 100.

At step 302, the external device transmits an interaction to a smart sample container via a communications interface on the container. In various embodiments the communication interface may correspond to one or more of near field network interface (e.g., Bluetooth, wireless, RFID, short wave, etc.) and/or a wired network interface. The external device may be programmed to communicate using a plurality of protocols, a common protocol for multiple devices, or a combination thereof. The interaction may identify information such as an identity of the external device, a type of device, settings of the external device, a schedule of the external device, capabilities of the external device, etc.

At step 304, the external device receives an interaction form the smart sample container via the communications interface on the container. The interaction may include an executable script, sample information, step/action information, parameters associated with the step/action, etc. that cause and/or otherwise enable the external device to perform a step/action within a sample evaluation workflow associated with a sample on the smart sample container. Because the sample evaluation workflow is stored and managed by the smart sample container itself, the external device is not required to access a centralized storage system to obtain information necessary to evaluate the sample.

At step 306, the external device performs an action to advance the sample evaluation workflow. In some embodiments, the external device uses the information in the interaction it received in step 304 determine the action(s) that are to be performed by the external device, settings for the external device, parameters for the action, etc. For example, where the external device is a vitrification system, the external device may use the interaction from the smart sample container to select optimal settings for vitrifying the sample.

At step 308, the external device may transmit an interaction indicating that the action is complete to the smart sample container via the communication interface. This may correspond to an indication of a type of action completed, a result of the action being completed, information about the performance of the action, information about the result, updated information about the sample, or a combination thereof.

Examples of inventive subject matter according to the present disclosure are described in the following enumerated paragraphs.

A1. A method for managing a sample evaluation workflow using a smart sample container, the method comprising: obtaining a sample evaluation workflow for the one or more samples; receiving an interaction with an external device; and based on the sample evaluation workflow, causing the external device to perform an action to advance the sample evaluation workflow.

A1.1. The method of paragraph A1, wherein the sample evaluation workflow corresponds to a collection of one or more steps that need to be taken to evaluate the sample.

A1.1.1. The method of paragraph A1.1, wherein the one or more steps include interactions of the sample and/or sample container with a plurality of different external devices.

A1.1.1.1. The method of paragraph A1.1.1, wherein individual external devices of the plurality of different external devices comprise at least one of: a microscopy system; a sample container transportation system; a vitrification system; and a sample preparation system.

A1.1.2. The method of any of paragraphs A1.1-A1.1.1.1, wherein the sample evaluation workflow further comprises parameters for evaluation for individual steps.

A1.1.2.1. The method of paragraph A1.1.2, wherein the parameters comprises external device settings, external device requirements, sample evaluation requirements, and sample information.

A1.1.3. The method of any of paragraphs A1.1-A1.1.2.1, wherein the sample evaluation workflow further comprises sample information.

A1.1.3.1. The method of paragraph A1.1.3, wherein the sample information comprises: a sample type; a location of the sample on the smart sample container; a history of the sample; and an identification code for the sample.

A2. The method of any of paragraphs A1-A1.1.3.1, wherein obtaining the sample evaluation workflow comprises receiving an uploaded workflow from an external device.

A2.1. The method of any of paragraphs A1-A2, wherein obtaining the sample evaluation workflow comprises receiving one or more instances of sample information, and determining the sample evaluation workflow based on the sample information.

A2.1.1. The method of paragraph A2.1, wherein determining the sample evaluation workflow corresponds to obtaining the sample evaluation workflow from a set of preset sample evaluation workflows.

A2.1.2. The method of any of paragraphs A2.1-A2.1.1, wherein determining the sample evaluation workflow corresponds to updating one or more steps of a/the preset workflow to obtain the sample evaluation workflow.

A2.1.3. The method of any of paragraphs A2.1-A2.1.2, wherein determining the sample evaluation workflow corresponds to determining, based on the instances of sample information, one or more of evaluation step(s) that is to be performed, external device(s) that are to perform the evaluation step(s), and external device settings for performing the evaluation step(s).

A2.2. The method of any of paragraphs A1-A2.1.3, wherein obtaining the sample evaluation workflow comprises determining parameters for individual steps of the workflow.

A2.2.1. The method of paragraph A2.2, wherein determining parameters for individual steps of the workflow is based on one or more of sample information, external device parameters, a status of one or more samples, and a history of the one or more sample.

A2.3. The method of any of paragraphs A1-A2.2.1, wherein obtaining the sample evaluation workflow corresponds to obtaining a first sample evaluation workflow for at least a first sample of the one or more samples on the sample container, and the method further includes obtaining a second sample evaluation workflow for at least a second sample of the one or more samples on the sample container.

A3. The method of any of paragraphs A1-A2.3, wherein the external device is a microscopy system.

A3.1. The method of paragraph A3, wherein causing the external device to perform an action to advance the sample evaluation workflow comprises providing one of: a location of a sample on the sample container; a parameter of the sample; and an indication of the type of evaluation of the sample.

A3.2. The method of any of paragraphs A3-A3.1, wherein causing the external device to perform an action to advance the sample evaluation workflow comprises transmitting an executable script to the microscopy system that causes the microscopy system to perform a step of the sample evaluation workflow.

A3.2.1. The method of paragraph A3.2, wherein the executable script causes the microscopy system to automatically execute the step of the sample evaluation workflow.

A4. The method of any of paragraph A1-A3.2.1, further comprising: receive an interaction with an additional external device; and determining, based on the interaction that the additional external device is not able to fulfill a step of the sample evaluation workflow.

A4.1. The method of paragraph A4, further comprising determining that the external device can fulfill the next step of the sample evaluation workflow.

A4.2. The method of any of paragraphs A4-A4.1, wherein the determination that the additional external device is not able to fulfill the step of the sample evaluation workflow based on one or more of an ability of the additional external device, a status of the additional external device, and a schedule of the additional external device.

A4.3. The method of any of paragraph A4-A4.2, further comprising determining based at least in part on the interaction with the external device and the interaction with the additional external device, that the external device is more capable of fulfilling the step of the sample evaluation workflow than the additional external device.

A5. The method of any of paragraphs A1-A4.3, wherein the external device is a sample container transport device, and wherein the action to advance the sample evaluation workflow corresponds to at least one of: a location where a next step is to be fulfilled; a new external device that is to fulfil the next step; a type of external device that is to fulfill the next step; evaluation parameters for the next step; device features for fulfilling the next step; and an executable script that causes the sample container transport device to cause the delivery the sample container transport device to advance the sample evaluation workflow.

A6. The method of any of paragraphs A1-A5, wherein the smart sample container comprises a communication interface, and receiving the interaction with the external device comprises receiving a communication from the external device via the communication interface.

A6.1. The method of paragraph A6, wherein the communication interface comprises one or more of near field network interface, a wired network interface.

A6.2. The method of any of paragraphs A6-A6.1, wherein the communication includes an identifier associated with the external device.

A6.3. The method of any of paragraphs A6-A6.2, wherein the communication includes system information of the external device.

A6.3.1. The method of paragraph A6.3, wherein the system information comprise at least one of, a status, a schedule, device settings, device parameters, and device capabilities.

A7. The method of any of paragraphs A1-A6.3.1, wherein the smart sample container comprises a communication interface, causing the external device to perform the action to advance the sample evaluation workflow comprises transmitting a communication to the external device via the communication interface.

A7.1. The method of paragraph A7, wherein the communication interface comprises one or more of near field network interface, a wired network interface.

A7.2. The method of any of paragraphs A7-A7.1, wherein transmitting the communication comprises transmitting electronic instructions to the external device.

A7.3. The method of any of paragraphs A7-A7.2, wherein transmitting the communication comprises transmitting an executable script to the external device that when executed by the external device causes the external device to advance the sample evaluation workflow.

A7.3.1. The method of paragraph A7.3, wherein advancing the sample evaluation workflow comprises performing a step indicated by the evaluation workflow.

A7.4. The method of any of paragraphs A7-A7.3.1, wherein transmitting the communication comprises transmitting to the external device one or more of: instructions for a step in the evaluation workflow; sample parameters; recommended external device settings; a sample type; a location of the sample on the smart sample container; a history of the sample; and an identification code for the sample.

A8. The method of any of paragraphs A1-A7.4, further comprising receiving an additional communication with the external device.

A8.1. The method of paragraph A8, wherein the additional communication comprises one or more of: an indication that a step in the workflow was completed; a result of the action to advance the sample evaluation workflow; new parameters of the sample; and instructions for a next step in workflow.

A9. The method of any of paragraphs A1-A8.1, further comprising monitoring, by the smart sample container, a status of the sample.

A9.1. The method of paragraphs A9, further comprising, based on detecting an event, the smart sample container modifies the evaluation workflow.

A9.1.1. The method of paragraphs A9.1, Wherein the modification of the evaluation workflow is based on the smart sample container detecting a plurality of events.

A9.2. The method of any of paragraphs A9-A9.1, further comprising, based on detecting an event, the smart sample container stores information comprising and identifier of the detect event, parameters of the detected event, change workflow based on multiple events.

A9.3. The method of any of paragraphs A9-A9.2, wherein the detected modifying the evaluation workflow comprises one or more of adding a new step, adjusting parameters for one or more steps, causing a step to be performed again, and selecting a new evaluation workflow to be performed.

A9.4. The method of any of paragraphs A9-A9.3, wherein detecting the event corresponds to determining that the smart sample container has received an impact greater than a threshold force, and adding a step to the evaluation workflow for the state of the sample(s) in the smart sample container to be evaluated by a microscopy device.

A9.5. The method of any of paragraphs A9-A9.3, wherein the smart sample container is a cryo sample container that has been vitrified, and detecting the event corresponds to determining that the smart sample container has dropped below a threshold temperature for a present amount of time, and adding a step to the evaluation workflow for the state of the sample(s) in the smart sample container to be evaluated by a microscopy device.

B1. A smart sample container configured to manage a sample evaluation workflow across multiple devices, the smart sample container comprising: a region of the smart sample container for holding a sample carrier holding one or more samples; an outer support structure that defines the region of the sample container for holding one or more samples; a communication interface; one or more processors; and a memory storing computer readable instructions that, when executed on the one or more processors, cause the one or more processors to perform the methods of any of paragraphs A1-A9.3.

B2. The smart sample container of paragraph B1, wherein the instructions cause the processors on the smart sample container to perform one or more of: manage store sample information; distribute sample information; determining an evaluation workflow for evaluating the one or more samples; determine parameters/settings for individual steps of the evaluation workflow; store parameters/settings for individual steps of the evaluation workflow; manage evaluation of the one or more samples across multiple devices; maintain a history of the evaluation of the one or more samples; cause the smart sample container to navigate between external devices; and/or cause individual external devices to perform steps of the evaluation workflow.

B3. The smart sample holder of any of paragraphs B1-B2, wherein the sample carrier is a component portion of the smart sample container.

C1. Non-transitory computer readable instructions, that when executed on one or more processors of a smart sample container, cause the one or more processors to perform the methods of any of paragraphs A1-A9.3.

D1. Use of a smart sample container of paragraphs B1 or B2 to perform any of the methods of paragraphs A1-A9.3.

E1. A microscopy evaluation system, comprising: one or more components configured to perform a step of a sample evaluation workflow; a communication interface; one or more processors; and a memory storing computer readable instructions that, when executed on the one or more processors, cause the one or more processors to: receive, via the communication interface, electronic instructions from a smart sample container of any of paragraphs B1-B2 comprising one or more samples; and based on the interaction, perform the step of the sample evaluation workflow on the one or more samples.

E2. The microscopy evaluation system of paragraph E1, wherein the electronic instructions comprise an executable script that when executed by the one or more processors causes the microscopy evaluation system to perform the step of the sample evaluation workflow.

E2.1. The microscopy evaluation system of paragraph E2, wherein the executable script causes the microscopy evaluation system to automatically perform the step of the sample evaluation workflow.

E3. The microscopy evaluation system of any of paragraphs E1-E2.1, wherein transmitting the electronic instructions comprise one or more of: instructions for a step in the evaluation workflow; sample parameters; recommended microscopy evaluation system settings; a sample type; a location of the sample on the smart sample container; a history of the sample; and an identification code for the sample.

E4. The microscopy evaluation system of any of paragraphs E1-E3, wherein the instructions further cause the one or more processors to transmit additional electronic instructions to the smart sample container.

E4.1. The microscopy evaluation system of paragraph E4, wherein transmitting the electronic instructions comprise one or more of: results of the performance of the step in the evaluation workflow; new sample parameters; new recommended microscopy evaluation system settings; a new sample type; and an updated history of the sample.

E5. The microscopy evaluation system of any of paragraphs E1-E4.1, wherein the communication interface comprises one or more of near field network interface, a wired network interface.

F1. A sample transport device, comprising: one or more components configured to transport a smart sample container of any of paragraphs B1-B2; a communication interface; one or more processors; and a memory storing computer readable instructions that, when executed on the one or more processors, cause the one or more processors to: receive, via the communication interface, electronic instructions from a smart sample container comprising one or more samples; and based on the interaction, transport the smart sample container to a next step of a sample evaluation workflow.

F2. The sample transport device of paragraph F1, wherein the electronic instructions comprise at least one of: a location where the next step is to be fulfilled; an external device that is to fulfil the next step; a type of external device that is to fulfill the next step; evaluation parameters for the next step; device features for fulfilling the next step; and an executable script that causes the sample container transport device to cause the delivery the sample container transport device to advance the sample evaluation workflow.

What is claimed is:

1. A method for a smart sample container configured to transport a plurality of sample grids and configured to manage an electron microscopy evaluation workflow across multiple external devices including an electron microscope, the method comprising:

obtaining or determining an electron microscopy evaluation workflow for a sample on a sample grid of the plurality of sample grids by a workflow management module of the smart sample container;

receiving an interaction from a first external device by an interaction module of the smart sample container, the interaction including results of a step or action performed by the first external device;

altering, using the workflow management module, a future step or action in the electron microscopy evaluation workflow based upon the results; and based on the electron microscopy evaluation workflow, providing a location of the sample grid on the smart sample container to a second external device, and transmitting an executable script from the workflow management module to the second external device to cause the second external device to perform an action to advance the electron microscopy evaluation workflow, wherein the action includes automatically executing a step of the electron microscopy evaluation workflow.

2. The method of claim 1, wherein the electron microscopy evaluation workflow corresponds to a collection of one or more steps that need to be taken to evaluate the sample.

3. The method of claim 1, wherein the multiple external devices comprises at least one of:

a dual beam microscopy system;

a sample container transportation system;

a vitrification system; or a sample preparation system.

4. The method of claim 1, wherein the electron microscopy evaluation workflow further comprises at least one of external device settings, external device requirements, sample evaluation requirements, and sample information.

5. The method of claim 1, wherein the electron microscopy evaluation workflow further comprises:

a sample type;

a history of the sample; and an identification code for the sample.

6. The method of claim 1, wherein obtaining the electron microscopy evaluation workflow comprises receiving an uploaded workflow from an external device.

7. The method of claim 6, wherein obtaining the electron microscopy evaluation workflow further comprises updating one or more steps of the uploaded workflow to obtain the electron microscopy evaluation workflow.

8. The method of claim 1, wherein obtaining the electron microscopy evaluation workflow comprises:

receiving one or more instances of sample information; and selecting, based on the sample information, the electron microscopy evaluation workflow from a set of preset electron microscopy evaluation workflows.

9. The method of claim 1, wherein obtaining the electron microscopy evaluation workflow comprises:

receiving one or more instances of sample information;

determining, based on the instances of sample information, one or more evaluation steps that are to be performed;

determining, based on the instances of sample information, external devices that are to perform the evaluation steps; and determining, based on the instances of sample information, external device settings for performing the evaluation steps.

10. The method of claim 1, wherein obtaining the electron microscopy evaluation workflow comprises determining parameters for individual steps of the workflow based on one or more of sample information, external device parameters, a status of one or more samples, and a history of the one or more samples.

11. The method of claim 1, wherein causing the external device to perform an action to advance the electron microscopy evaluation workflow further comprises providing at least one of:

a parameter of the sample; or an indication of the type of evaluation of the sample.

12. The method of claim 1, wherein one of the multiple external devices is a sample container transport device, and further comprising an action to advance the electron microscopy evaluation workflow corresponding to at least one of:

a location where a next step is to be fulfilled;

a new external device that is to fulfill the next step;

a type of external device that is to fulfill the next step;

evaluation parameters for the next step; or device features for fulfilling the next step.

13. The method of claim 1, wherein receiving the interaction with the first external device comprises receiving a communication from the external device via a communication interface that identifies at least one of a status, a schedule, device settings, device parameters, or device capabilities.

14. The method of claim 1, wherein causing the second external device to perform the action to advance the electron microscopy evaluation workflow transmitting the communication further comprises the smart sample container transmitting to the external device one or more of:

instructions for a step in the electron microscopy evaluation workflow;

sample parameters;

recommended external device settings;

a sample type;

a history of the sample; and an identification code for the sample.

15. The method of claim 1, further comprising receiving an additional communication with the first external device that comprises one or more of:

an indication that a step in the electron microscopy evaluation workflow was completed;

a result of the action to advance the electron microscopy evaluation workflow;

new parameters of the sample; and instructions for a next step in the electron microscopy evaluation workflow.

16. The method of claim 1, further comprising:

monitoring, by the smart sample container, a status of the sample; and modifying, by the smart sample container, the electron microscopy evaluation workflow based on the detection of an event.

17. The method of claim 16, wherein modifying the electron microscopy evaluation workflow comprises one or more of adding a new step, adjusting parameters for one or more steps, causing a step to be performed again, and selecting a new electron microscopy evaluation workflow to be performed.

18. The method of claim 1, wherein the multiple external devices comprise a vitrification system and the smart sample container further comprises a temperature sensor, the method further comprising:

determining, using the temperature sensor, that the smart sample container has dropped below a threshold temperature for a preset amount of time, and adding, using the workflow management module, a step to the electron microscopy evaluation workflow to use the electron microscope to determine the state of the sample in the smart sample container.

19. A smart sample container configured to transport a plurality of sample grids and configured to manage an electron microscopy evaluation workflow across multiple devices including an electron microscope, the smart sample container comprising:

a region of the smart sample container for holding the plurality of sample grids, each sample grid containing one or more samples;

an outer support structure that defines the region of the smart sample container for holding the sample grids;

a communication interface;

one or more processors; and a memory storing a workflow management module, an interaction module, and computer readable instructions that, when executed on the one or more processors, cause the one or more processors to:

obtain or determine an electron microscopy evaluation workflow for a sample on a sample grid of the plurality of sample grids using the workflow management module;

receive an interaction from a first external device with the interaction module, the interaction including results of a step or action performed by the first external device;

altering, using the workflow management module, a future step or action in the electron microscopy evaluation workflow based upon the results; and based on the electron microscopy evaluation workflow, provide a location of the sample grid on the smart sample container to a second external device, and transmit an executable script from the workflow management module to the second external device to cause the second external device to perform an action to advance the electron microscopy evaluation workflow, wherein the action includes automatically executing a step of the electron microscopy evaluation workflow.

* * * * *